3,493,461
GLASS FIBER REINFORCED POLYVINYL CHLORIDE RESIN ARTICLE AND PROCESS THEREFOR
Samuel Sterman, Williamsville, and James G. Marsden, Tonawanda, N.Y., assignors to Union Carbide Corporation, a corporation of New York
No Drawing. Continuation of application Ser. No. 523,875, Feb. 1, 1966. This application Jan. 21, 1969, Ser. No. 797,341
Int. Cl. B32b 17/10, 27/30
U.S. Cl. 161—93                              26 Claims

ABSTRACT OF THE DISCLOSURE

An article of manufacture and method for the production thereof, the article which is a thermoplastic composite of fibrous glass, a polyvinyl chloride resin, and an organofunctional silane selected from the group consisting of a trialkoxysilylalkyl urea, a N,N'-bis-(trialkoxysilylalkylcarbamoyl) urea, an aminoalkyltrialkoxysilane, an (epoxycycloalkyl) alkyltrialkoxysilane, a glycidoxyalkyltrialkoxysilane, an (acryloxy) alkyltrialkoxysilane, and an (isocyanato) alkyltrialkoxysilane, or a hydrolyzate thereof.

---

This application is a continuation of Ser. No. 523,875 filed Feb. 1, 1966, now abandoned. This invention is directed to glass-reinforced polyvinyl chloride resins.

Polyvinyl chloride resins are thermoplastic materials of construction which have diversified uses including electrical insulation, piping, protective clothing, shower curtains, floor tile, toys, and the like. While these resins possess desirable physical properties, an additional improvement thereof can be achieved by reinforcing these resins with strengthening materials such as glass in fibrous form, for example.

It has now been found, however, that a further improvement in the physical properties of glass-reinforced polyvinyl chloride resins can be achieved by treating the fibrous glass, prior to its incorporation within the resin, with certain chemical compounds. Accordingly, it is the principal object of this invention to provide, as a material of construction, a polyvinyl chloride resin reinforced by fibrous glass and exhibiting materially enhanced physical properties while retaining its thermoplastic properties.

A further object of this invention is to provide a method for enhancing the physical properties of polyvinyl chloride resins.

Still other objects will become apparent to one skilled in the art upon reference to the ensuing specification and the claims.

The objects of this invention are achieved by an article of manufacture which is a thermoplastic composite of fibrous glass, a polyvinyl chloride resin, and an organofunctional silane which can be a trialkoxysilylalkyl urea, N,N-bis-(trialkoxysilylalkylcarbamoyl) urea, an aminoalkyltrialkoxysilane, an (epoxycycloalkyl)alkyltrialkoxysilane, a glycidoxyalkyltrialkoxysilane, an (acryloxy)alkyltrialkoxysilane, an (isocyano)alkyltrialkoxysilane, or a corresponding hydrolyzate of the foregoing.

The above article of manufacture, possessing the enhanced physical properties, can be prepared by (1) providing a fibrous glass substrate, (2) treating this substrate with the aforementioned organofunctional silane, (3) intimately contacting the treated glass substrate with the polyvinyl chloride resin, and (4) thermoforming the resulting composite at a temperature below the decomposition temperature of the resin and the silane.

The polyvinyl chloride resin is thermoplastic, substantially fully polymerized, relatively chemically inert, and contains no apparent reaction sites. This resin may be thermoformed over and over again without undergoing further cure or hardening. Any residual unsaturation remaining in the resin after polymerization of the monomer has been carried out is incidental and does not affect its thermoplastic nature.

The crux of the present invention lies in the selection of the proper organofunctional silane for the treatment of the fibrous glass employed for reinforcement of the resin. This selection must be carried out with great care since an improvident choice can work to the detriment of the physical properties of the ultimate article. Furthermore, considerable research into the reaction mechanisms involved has failed to cast sufficient light on the observed phenomena so as to enable the skilled artisan to make a reliable prediction of the performance of a particular organofunctional silane in the selected resin system.

The following groupings of organofunctional silanes have been found to materially enhance the physical properties of a polyvinyl chloride resin reinforced by fibrous glass: (a) a trialkoxysilylalkyl urea such as triethoxysilylpropyl urea, trimethoxysilylpropyl urea, tributoxysilylbutyl urea, triethoxysilylhexyl urea, trimethoxysilyloctyl urea, N-trimethoxysilylpropyl-, N'-triethoxysilylpropyl urea, N,N-bis-(triethoxysilylpropyl) urea, N-trimethoxysilylbutyl-, N'-triethoxysilylpropyl urea, and the like;

(b) N,N'-bis(trialkoxysilylalkylcarbamoyl) urea such as N,N'-bis(triethoxysilylpropylcarbamoyl) urea, N,N'-bis(trimethoxysilylpropylcarbamoyl) urea, N,N'-bis(trimethoxysilylbutylcarbamoyl) urea, N,N' - bis(tributoxysilylhexylcarbamoyl) urea, N,N' - bis(triethoxysilyloctylcarbamoyl) urea, and the like;

(c) an aminoalkyltrialkoxysilane such as gamma-aminopropyltriethoxysilane, beta - aminoethyltrimethoxysilane, delta - aminobutyltriethoxysilane, gamma - aminopropyltrimethoxysilane, and the like. This particular subgrouping also includes the N- substituted aminoalkyltrialkoxysilane such as the N-(hydroxyalkyl)aminoalkyltrialkoxysilanes exemplified by N-(beta-hydroxyethyl)-gamma-aminopropyltriethoxysilane, N,N-bis-(beta - hydroxyethyl) - gamma - aminopropyltriethoxysilane, N-(beta-hydroxyethyl) - delta - aminobutyltrimethoxysilane, and the like; the N-(acetoxy) - aminoalkyltrialkoxysilanes exemplified by N-(acetoxy)-gamma-aminopropyltriethoxysilane, N - (acetoxy) - gamma - aminopropyltrimethoxysilane, N - (acetoxy) - delta - aminobutyltriethoxysilane, N - (acetoxy) - gamma - aminopropyltributoxysilane, and the like; the N-(carbalkoxy)-aminoalkyltrialkoxysilanes exemplified by N-(carbmethoxy)-gamma-aminopropyltriethoxysilane, N-(carbethoxy) - gamma - aminopropyltrimethoxysilane, N - (carbpropoxy) - delta - aminobutyltriethoxysilane, and the like; the N-(carbaroxy)aminoalkyltrialkoxysilane exemplified by N-(carbphenoxy) - gamma-aminopropyltriethoxysilane, N-(carbphenoxy) - gamma-aminopropyltrimethoxysilane, N - (carbnaphthoxy)-gamma - aminopropyltriethoxysilane, N-(carbphenoxy)-delta-aminobutyltrimethoxysilane, and the like; and (d) an (acryloxy)alkyltrialkoxysilane such as gamma-(methacryloxy)propyltrimethoxysilane, gamma - (acryloxy)propyltriethoxysilane, delta-(methacryloxy)butyltrimethoxysilane, gamma - (ethacryloxy)propyltributoxysilane, and the like;

(e) an (epoxycycloalkyl)alkyltrialkoxysilane such as beta - (3,4 - epoxycyclohexyl)ethyltrimethoxysilane, beta-(3,4 - epoxycyclohexyl)propyltriethoxysilane, beta - (4,5-epoxycycloheptyl)ethyltrimethoxysilane, delta - (2,3-epoxycyclohexyl)butyltripropoxysilane, and the like;

(f) a glycidoxyalkyltrialkoxysilane such as gamma-glycidoxypropyltrimethoxysilane, beta - glycidoxyethyltributoxysilane, delta - glycidoxybutyltriethoxysilane, gamma - glycidoxyoctyltripropoxysilane, and the like; and (g) an (isocyano)alkyltrialkoxysilane such as beta-(isocyano)ethyltriethoxysilane, gamma - isocyanopropyltriethoxysilane, beta - (isocyano)butyltrimethoxysilane, delta - (isocyano)octyltributoxysilane, gamma - (isocyano)octyltrimethoxysilane, and the like.

In order to be suitable for the purposes of the present invention the glass substrate must be fibrous; however, any form of fibrous glass can be employed. Suitable are woven cloth, chopped mat, continuous strand mat, chopped strand, roving, woven roving, and the like. Powdered glass is not suitable.

The fibrous glass can be treated, i.e., sized with the organofunctional silane, in any convenient manner. The silane can be applied to the glass fibers at the extrusion bushing as the glass fibers are produced, or the sizing can be carried out by means of an aqueous solution of the proper silane into which the glass fibers are dipped and subsequently dried. In the latter case the silane is deposited on the glass fiber as the corresponding hydrolyzate.

It will be apparent to one skilled in the art that the materials actually deposited on the fibrous glass from aqueous solutions are the silane derived hydrolyzates rather than the silanes as such. The hydrolyzates are siloxanes, e.g., an aqueous solution of beta-(3,4-epoxycyclohexyl)ethyltrimethoxysilane deposits on the glass fibers as beta-(3,4-epoxycyclohexyl)ethylsiloxane. Also, during the hydrolysis the epoxy ring may open to produce the corresponding hydroxycyclohexylethylsiloxane.

The silane loading on the glass fibers must be sufficient to enhance the flexural strength of the ultimate thermoformed article. While for practical applications the loading is usually expressed in terms of weight percent, based on the weight of the treated glass fibers, it must be recognized that the minimum loading requirement may vary depending on the surface area of the particular glass fibers that are employed. When fibrous glass having a surface area of from about 0.1 to about 0.2 square meters per gram is employed, the effective silane loading can range from about 0.01 to about 5 weight percent, based on the weight of the treated fiber. Preferably the silane loading is in the range from about 0.1 to about 0.75 weight percent.

The silane-treated glass and the polyvinyl chloride resins can be brought in intimate contact with each other in any convenient manner and then thermoformed. The term "thermoforming," as used herein and in the appended claims, is taken to mean the transformation of the resin-silane-glass composite into useful shapes by means of heat and/or pressure. Illustrative thermoforming processes are molding, extrusion, hot calendering, casting, vacuum forming, and the like.

Several methods of achieving intimate contact between the treated fibrous glass and the polyvinyl chloride resin are illustrated by the examples below. Still other methods include the utilization of resin film or sheet and the preparation therefrom of a dry laminate having alternate plies of fibrous glass and resin which is then molded, the admixture of chopped, silane-treated glass fibers with warm or hot, fluid resin in a mechanical mixer prior to extrusion, the calendering of the resin onto a treated glass cloth or mat, and the like.

The example below further illustrates the present invention. Glass reinforcement in the form of woven glass fabric was used in the example. The fabric was a satin weave cloth having a thickness of 10 mils, weighing about 8.9 ounces per square yard, having 57×54 ends and picks per square inch and having a breaking strength of 375×350 pounds per square inch. The fabric had the weaving size burned off in a heat cleaning operation. The control in all instances comprised resin reinforcement with cloth having had no silane treatment.

The thermoplastic polyvinyl chloride resin employed in the example was a commercial grade of rigid polyvinyl chloride in the form of a 0.010 inch sheet.

EXAMPLE

This example shows a comparison of the effect on the flexural strength of a glass reinforced polyvinyl chloride composite of using glass reinforcement without a silane and glass reinforcement treated with various organofunctional silanes. The silane was applied to the glass from an aqueous solution (i.e., water or water-ethanol solutions) containing about one weight percent of the silane. The glass fabric was passed through the solution, dried at room temperature, and then placed in an oven for two and one-half minutes at about 135° C. (275° F.). A silane coating remained on the fabric equivalent to about 0.5 weight percent silane, based on weight of fabric.

Eleven 10" x 10" squares of treated glass fabric and twelve 10" x 10" pieces of 0.010 inch thick polyvinyl chloride sheets were cut. A dry laminate of alternating plies of resin and treated glass fabric was constructed from these materials. The dry laminate was placed preheated to about 177° C. (350° F.) between sheets of 0.003 inch Mylar film and pressed at 650–700 p.s.i. for laminates in Part 1 and at about 125 tons for laminates in Part 2 of the experimental work. The material was molded for about 20 minutes for Part 1 and about 15 minutes for Part 2, the press cooled, and the composite removed. The Mylar film was readily stripped from the cooled molding. This procedure produced a composite about 0.160 inch thick and having a resin content of 55±3 wt.-percent.

A second composite was prepared by the same procedure except untreated glass fabric was used as reinforcement.

Flexural strength test specimens of approximately 4" x ½" x ⅛" were cut from both types of composites and the flexural strength determined according to ASTM method D–790–61. Specimens from each composite were divided into two groups. Group 1 was tested at room temperature and Group 2 at room temperature after the specimens had been immersed in water at about 50° C. (122° F.) for 16 hours. The flexural strengths are given in Table I, below

TABLE I

| Silane Composition | Wt. percent | Flexural strength, p.s.i.×10⁻³ | |
|---|---|---|---|
| | | Dry | Wet |
| Part 1: | | | |
| Control | | 23.8 | 20.0 |
| Gamma-aminopropyltriethoxysilane | 0.5 | 36.2 | 32.9 |
| Beta-(3,4-epoxycyclohexyl)ethyl-trimethoxysilane | 0.5 | 32.0 | 30.6 |
| Gamma-glycidoxypropyltrimethoxysilane | 0.5 | 33.2 | 24.4 |
| N,N-bis(beta-hydroxyethyl)-gamma-aminopropyltriethoxysilane | 0.5 | 44.1 | 40.3 |
| Gamma-isocyanopropyltriethoxysilane | 0.5 | 44.2 | 39.4 |
| Part 2: | | | |
| Control | | 40.0 | 21.8 |
| N-(acetoxy)-gamma-aminopropyltriethoxysilane | 0.5 | 55.5 | 50.8 |
| N-(carbmethoxy)-gamma-aminopropyltriethoxysilane | 0.5 | 53.6 | 43.6 |
| $(C_2H_5O)_3Si(CH_2)_3N(H)-C(O)-NH_2$ | 0.5 | 53.4 | 50.3 |
| Gamma-(methacryloxy)propyltrimethoxysilane | 0.5 | 49.8 | 43.5 |
| $OCN(CH_2)_3Si(OCH_3)_3$ | 0.5 | 50.1 | 46.1 |
| $C_6H_5OC(O)N(H)(CH_2)_3Si(OC_2H_5)_3$ | 0.5 | 56.7 | 51.0 |
| $(C_2H_5O)_3Si(CH_2)_3NH\text{-}C(O)NHC(O)NH(CH_2)_3Si(OC_2H_5)_3$ | 0.5 | 48.7 | 43.0 |
| $(CH_3O)_3Si(CH_2)_3NHC(O)NH(CH_2)_3Si(OC_2H_5)_3$ | 0.5 | 53.4 | 50.3 |
| Gamma-aminopropyltriethoxysilane | 0.5 | 54.4 | 51.3 |

Data in the foregoing table clearly show that a substantial increase in the flexural strength of glass-reinforced polyvinyl chloride resin can be achieved by treating the reinforcing glass with certain organofunctional silanes.

What is claimed is:

1. A method for reinforcing thermoplastic polyvinyl chloride resin which comprises (1) providing a fibrous glass substrate, (2) treating the glass substrate with an organofunctional silane which is a member of the group consisting of a trialkoxysilylalkyl urea, a N,N'-bis-(trialkoxysilylalkylcarbamoyl) urea, an aminoalkyltrialkoxysilane an (epoxycycloalkyl)alkyltrialkoxysilane, a glycidoxyalkyltrialkoxysilane, an (acryloxy)alkyltrialkoxysilane, and an (isocyanato)alkyltrialkoxysilane, or a hydrolyzate thereof, (3) intimately contacting the treated glass substrate with the polyvinyl chloride resin, and (4) thermoforming the resulting composite at a temperature below the decomposition temperature of the resin and the silane; the amount of silane deposited on the glass fiber being sufficient to enhance the flexural strength of the thermoformed composite.

2. The method in accordance with claim 1 wherein the organofunctional silane is gamma-aminopropyltriethoxysilane or the corresponding hydrolyzate thereof.

3. The method in accordance with claim 1 wherein the organofunctional silane is beta-(3,4-epoxycyclohexyl)-ethyltrimethoxysilane or the corresponding hydrolyzate thereof.

4. The method in accordance with claim 1 wherein the organofunctional silane is gamma-glycidoxypropyltrimethoxysilane or the corresponding hydrolyzate thereof.

5. The method in accordance with claim 1 wherein the organofunctional silane is N,N-bis-(beta-hydroxyethyl)-gamma-aminopropyltriethoxysilane or the corresponding hydrolyzate thereof.

6. The method in accordance with claim 1 wherein the organofunctional silane is gamma-isocyanatopropyltriethoxysilane or the corresponding hydrolyzate thereof.

7. The method in accordance with claim 1 wherein the organofunctional silane is N-(acetoxy)-gamma-aminopropyltriethoxysilane or the corresponding hydrolyzate thereof.

8. The method in accordance with claim 1 wherein the organofunctional silane is triethoxysilylpropyl urea or the corresponding hydrolyzate thereof.

9. The method in accordance with claim 1 wherein the organofunctional silane is gamma-(methacryloxy)propyltrimethoxysilane or the corresponding hydrolyzate thereof.

10. The method in accordance with claim 1 wherein the organofunctional silane is gamma-isocyanatopropyltrimethoxysilane or the corresponding hydrolyzate thereof.

11. The method in accordance with claim 1 wherein the organofunctional silane is N-(carbphenoxy)-gamma-aminopropyltriethoxysilane or the corresponding hydrolyzate thereof.

12. The method in accordance with claim 1 wherein the organofunctional silane is N,N'-bis-(triethoxysilylpropylcarbamoyl) urea or the corresponding hydrolyzate thereof.

13. The method in accordance with claim 1 wherein the organofunctional silane is N-trimethoxysilylpropyl-N'-triethoxysilylpropyl urea or the corresponding hydrolyzate thereof.

14. An article of manufacture which is a thermoplastic composite of fibrous glass, a polyvinyl chloride resin, and an organofunctional silane selected from the group consisting of a trialkoxysilylalkyl urea, a N,N'-bis-(trialkoxysilylalkylcarbamoyl) urea, an aminoalkyltrialkoxysilane, an (epoxycycloalkyl)alkyltrialkoxysilane, a glycidoxyalkyltrialkoxysilane, an (acryloxy)alkyltrialkoxysilane, and an (isocyanato)alkyltrialkoxysilane, or a hydrolyzate thereof.

15. An article of manufacture in accordance with claim 14 wherein the organofunctional silane is gamma-aminopropyltriethoxysilane or the corresponding hydrolyzate thereof.

16. An article of manufacture in accordance with claim 14 wherein the organofunctional silane is beta-(3,4-epoxycyclohexyl)ethyltrimethoxysilane or the corresponding hydrolyzate thereof.

17. An article of manufacture in accordance with claim 14 wherein the organofunctional silane is gamma-glycidoxypropyltrimethoxysilane or the corresponding hydrolyzate thereof.

18. An article of manufacture in accordance with claim 14 wherein the organofunctional silane is N,N'-bis-(beta-hydroxyethyl)-gamma-aminopropyltriethoxysilane or the corresponding hydrolyzate thereof.

19. An article of manufacture in accordance with claim 14 wherein the organofunctional silane is gamma-isocyanatopropyltriethoxysilane or the corresponding hydrolyzate thereof.

20. An article of manufacture in accordance with claim 14 wherein the organofunctional silane is N-(acetoxy)-gamma-aminopropyltriethoxysilane or the corresponding hydrolyzate thereof.

21. An article of manufacture in accordance with claim 14 wherein the organofunctional silane is triethoxysilylpropyl urea or the corresponding hydrolyzate thereof.

22. An article of manufacture in accordance with claim 14 wherein the organofunctional silane is gamma-(methacryloxy)propyltrimethoxysilane or the corresponding hydrolyzate thereof.

23. An article of manufacture in accordance with claim 14 wherein the organofunctional silane is gamma-isocyanatopropyltrimethoxysilane or the corresponding hydrolyzate thereof.

24. An article of manufacture in accordance with claim 14 wherein the organofunctional silane is N-(carbphenoxy)-gamma-aminopropyltriethoxysilane or the corresponding hydrolyzate thereof.

25. An article of manufacture in accordance with claim 14 wherein the organofunctional silane is N,N'-bis-(triethoxysilylpropylcarbamoyl) urea or the corresponding hydrolyzate thereof.

26. An article of manufacture in accordance with claim 14 wherein the organofunctional silane is N-trimethoxysilylpropyl-, N'-triethoxysilylpropyl urea or the corresponding hydrolyzate thereof.

References Cited

UNITED STATES PATENTS 3,306,800   2/1967   Plueddemann _____ 161—193

ROBERT F. BURNETT, Primary Examiner

WILLIAM J. VAN BALEN, Assistant Examiner

U.S. Cl. X.R.

117—76, 126; 161—193; 264—90, 175